R. L. DICKERSON.
MOTOR VEHICLE.
APPLICATION FILED MAR. 20, 1918.
1,298,022.
Patented Mar. 25, 1919.
2 SHEETS—SHEET 1.
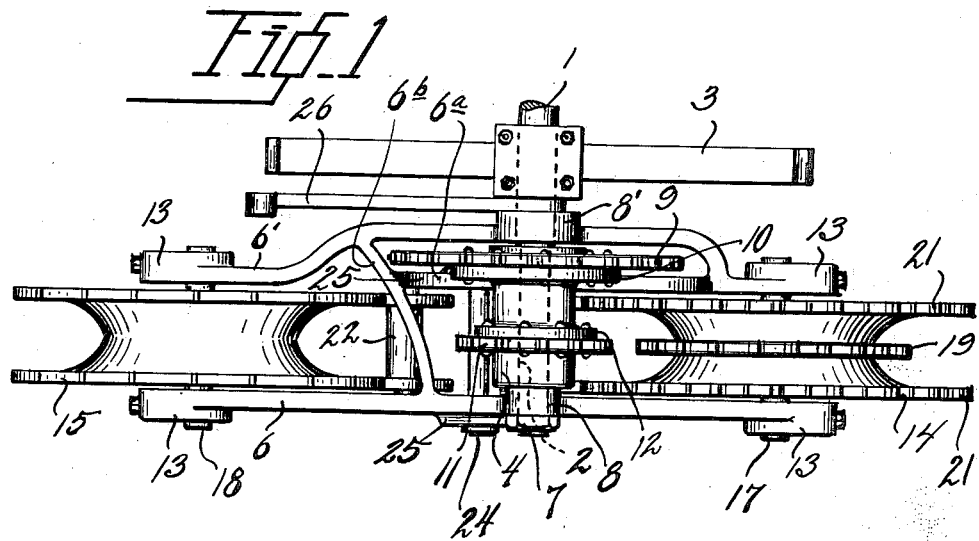
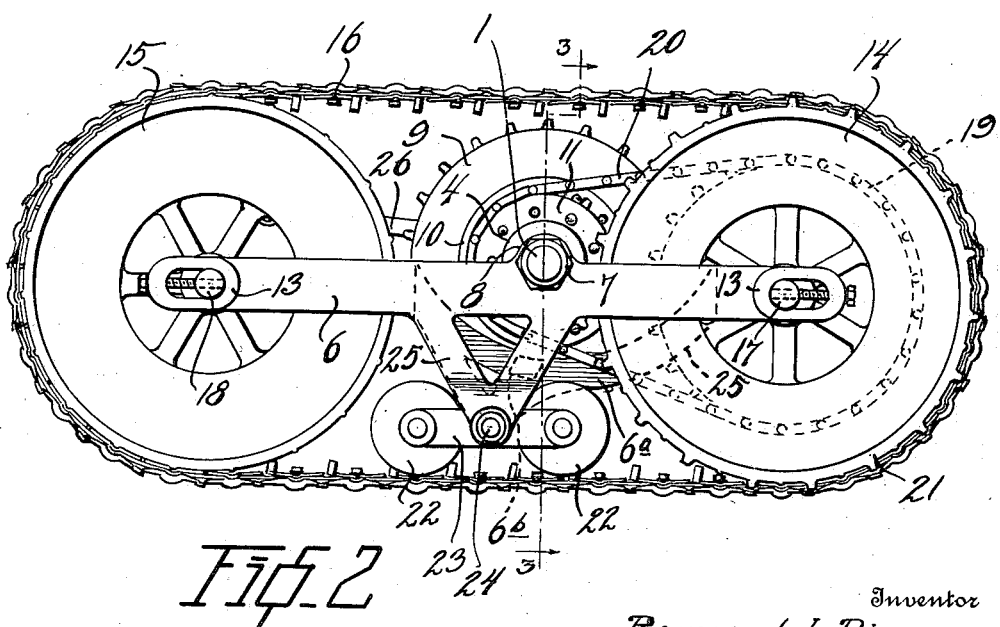
Inventor
Raymond L. Dickerson
By Herbert E. Smith
Attorney

R. L. DICKERSON.
MOTOR VEHICLE.
APPLICATION FILED MAR. 20, 1918.

1,298,022.

Patented Mar. 25, 1919.
2 SHEETS—SHEET 2.

Inventor
Raymond L. Dickerson

By Herbert E. Smith
Attorney

UNITED STATES PATENT OFFICE.

RAYMOND L. DICKERSON, OF SPOKANE, WASHINGTON, ASSIGNOR OF ONE-THIRD TO ANDREW S. JONES, OF SPOKANE, WASHINGTON, AND ONE-THIRD TO W. J. MICHELET, OF PORTLAND, OREGON.

MOTOR-VEHICLE.

1,298,022.      Specification of Letters Patent.      Patented Mar. 25, 1919.

Application filed March 20, 1918. Serial No. 223,511.

*To all whom it may concern:*

Be it known that I, RAYMOND L. DICKERSON, a citizen of the United States, residing at Spokane, in the county of Spokane and State of Washington, have invented certain new and useful Improvements in Motor-Vehicles, of which the following is a specification.

The present invention relates to improvements in motor vehicles and particularly to the wheel construction of the traction device known as the caterpillar type of traction wheels, and the primary object of the invention is to provide a device of this character that is suspended at a single point and capable of a rocking or oscillating motion on its pivot point in order to compensate for irregularities in the road traveled, and further to provide the oscillatable device with an additional oscillatable guide member whereby the flexible traction belt forming part of the traction device or caterpillar wheel, adds to the ability of the device to adapt itself to irregular or uneven roads. The invention consists essentially in certain novel combinations and arrangements of parts for accomplishing the above objects, as will be hereinafter more fully described in the claims.

In a contemporary application for patent, the construction of the traction belt which is illustrated herein and claimed in combination with the features of the present invention, is illustrated and claimed. The drawings accompanying the present application illustrate one complete example, in detail, of the physical embodiment of the invention, constructed and arranged according to the best mode so far devised for the application of the principles of the invention, but it will be apparent that changes or alterations may be made in the construction coming within the scope of my claims, without departing from the spirit of the invention.

Figure 1 is a top plan view of a device of this character embodying the invention.

Fig. 2 is a side elevation of the traction device of Fig. 1.

Figure 3:
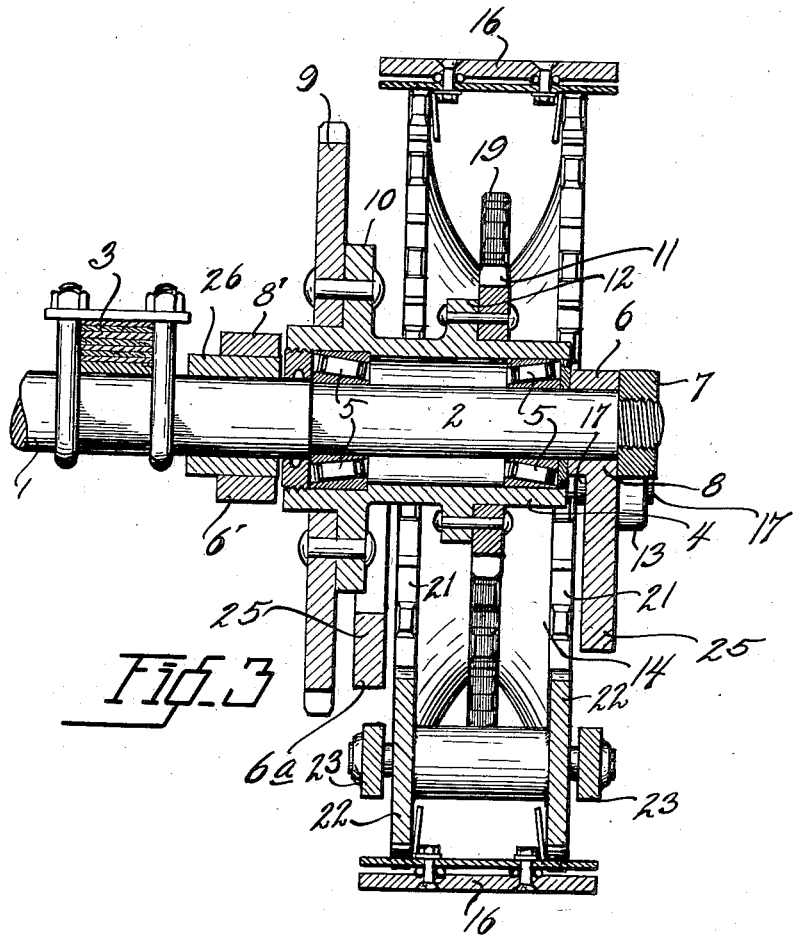
Fig. 3 is an enlarged, transverse sectional view on line 3—3 of Fig. 2.

In order to illustrate the applicability of the invention, the usual or standard axle 1 of an automobile, which may be of the truck type, or the tractor type, is shown with its journal end 2 and spring 3, and these features may be part of any of the standard types or makes of trucks or tractors from which the ordinary rear driving wheels have been removed, and these wheels are replaced by the traction device of the present invention.

The usual traction wheel is replaced by a barrel or hub 4, of suitable material and dimensions, and between the hub and journal are located the usual roller bearings 5, which not only perform the function of bearings for the hub, but also serve as oscillatable bearings for the swiveled frame upon which the traction devices are supported. This frame is composed of side bars as 6, 6' and 6$^a$ with suitable connecting braces 6$^b$, and the frame is retained on the journal of the axle by the usual lock nut 7 threaded thereon, and swiveled on the journal 2 by the bearing bosses 8 and 8' thus enabling the frame to tilt or rock as it travels over irregular or uneven surfaces.

At the inner end of the hub or barrel 4 is located a large sprocket wheel 9, riveted to the annular flange 10 of the hub and driven by a suitable chain from the motor of the vehicle of which the traction device forms a part, and a second sprocket wheel 11 is attached, as by rivets, to the annular flange 12 of the hub, which is located between the side bars of the frame. This sprocket wheel 11 is for the purpose of transmitting the power from the hub to the two traction wheels or sheaves which are supported in the bearing bosses 13, four in number, at the front and rear of the frame. The rear sheave 14 is connected with the front driven sheave 15 by the flexible, linked, traction belt 16, and these sheaves are journaled on the respective shafts 17 and 18 in the bearing bosses of the frame. The driving sheave receives power from the sprocket wheel 11 through the central sprocket 19 and chain 20, and the flexible traction belt receives power from the wheel or sheave 14 through the two toothed sprockets 21 21 of the sheave, which are both of uniformly larger diameter than the central sprocket 19 of this sheave. Located between the two sheaves, and designed to guide the traction belt, are a pair of idlers or rollers 22 22, journaled in the roller frame 23, and this frame in turn is pivoted at 24 in the drop frames 25 that depend from the side bars 6 and 6' of the wheel frame. At 26 is indicated a space bar having a head or sleeve of the journal or axle (Fig. 1) for the bearing boss 8', and this sleeve separates the traction device from the spring part of the vehicle.

It will be noted that the two traction sheaves and flexible traction belt are driven by connections that are compactly arranged and efficient in operation, and that the sheaves and their supporting frame are suspended at the one point on the journal 2 of the axle so that the frame and sheaves may tilt or oscillate bodily, in a longitudinal and vertical direction to compensate for irregularities in the path of travel. A further meritorious feature of the invention is the provision of the swiveled frame and pair of guide idlers or rollers which are adapted to respond to uneven surfaces over which the belt is passing, but at all times to be in position, regardless of the uneven surface, to guide and hold the traction belt in alinement, both in longitudinal and lateral directions.

The traction device herein described may form part of a completed tractor or truck, or it may be used as an auxiliary element, two in number, to replace the usual traction wheels of a truck or tractor during weather when the roads are in bad shape. The driving chain of the usual power transmission from the motor is coupled to the auxiliary wheel or gear 9, which, of course is of the same dimensions as the spur or sprocket wheel on the usual round traction wheel. By the arrangement of the swiveled or oscillatable frame on its journal, the traction belt is free to travel over rocks, or obstructions without danger of breaking parts, and without interference with the driving mechanism of the device which is located in well protected position in the frame.

Claims:

1. The combination of an axle and a frame pivoted thereon, a hub on the axle having a pair of sprocket wheels, a frame pivoted on the axle and a driving and driven sheave journaled in the frame, the driving sheave having a central sprocket member and a chain connecting said member with one of the hub sprockets, and an endless traction belt on the sheaves driven by one of said sheaves.

2. The combination of an axle and a hub thereon having a pair of sprocket wheels, a frame pivoted on the axle and a driving and driven sheave journaled in the frame, the driving sheave having a central sprocket member and a chain connecting said member with one of the hub sprockets, an endless, flexible traction belt passing over the sheaves, a drop frame formed on the pivoted frame, and a roller and roller frame pivoted in the drop frame.

In testimony whereof I affix my signature.

RAYMOND L. DICKERSON.